Figure 1:
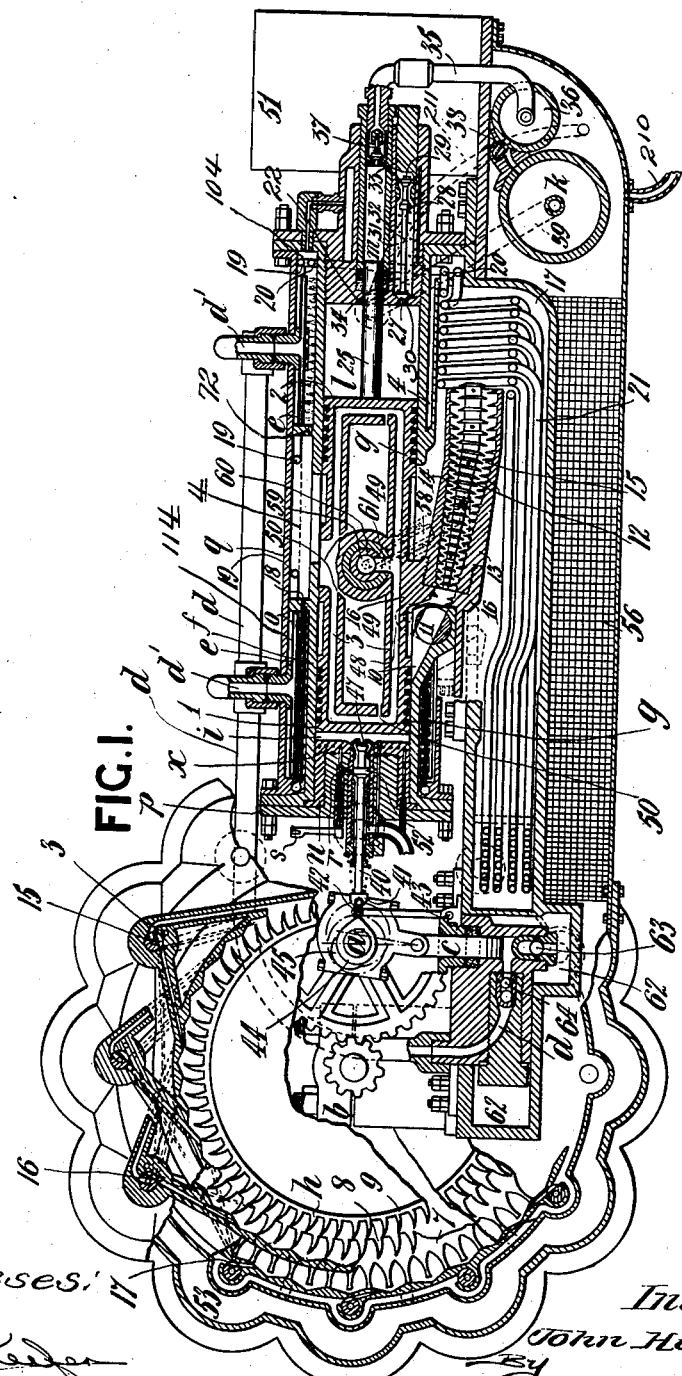

J. HUTCHINGS.
COMBINED TURBINE AND INTERNAL COMBUSTION MOTOR ENGINE.
APPLICATION FILED FEB. 24, 1908.

935,512.

Patented Sept. 28, 1909.

3 SHEETS—SHEET 1.

Witnesses:

Inventor
John Hutchings
By
James L. Norris

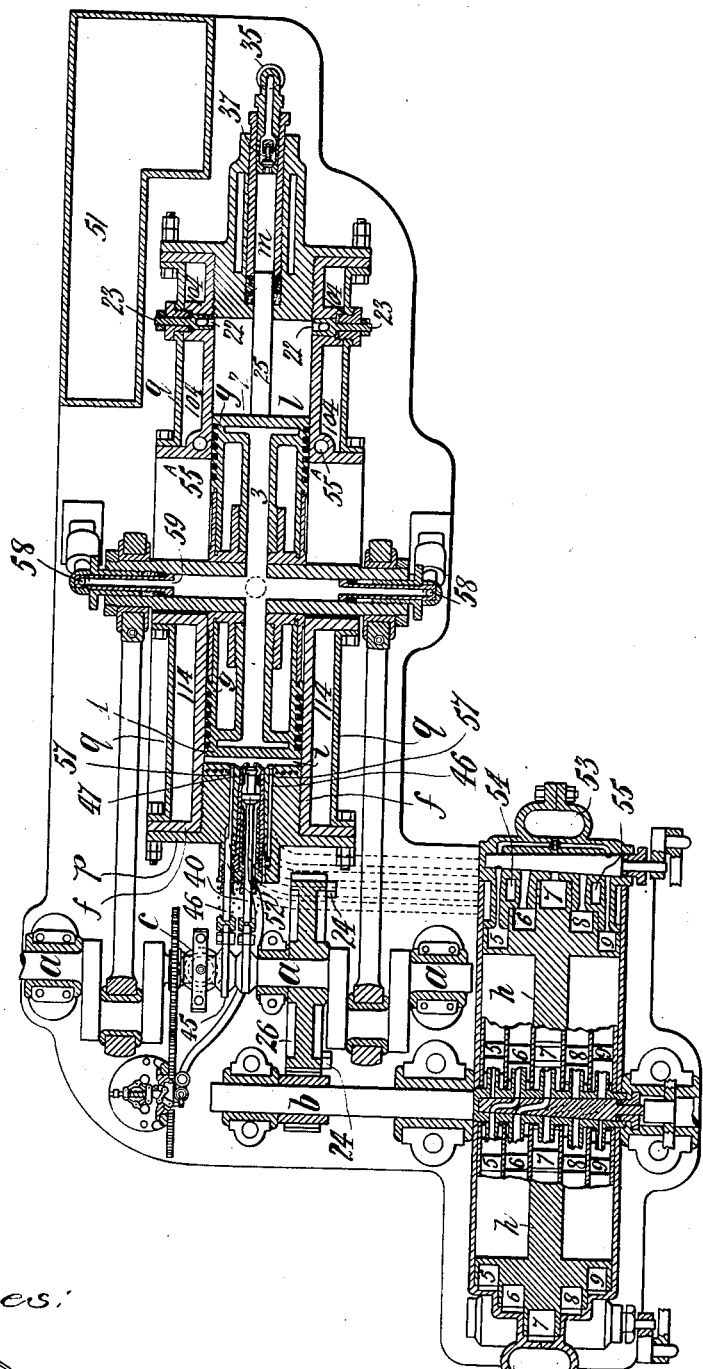

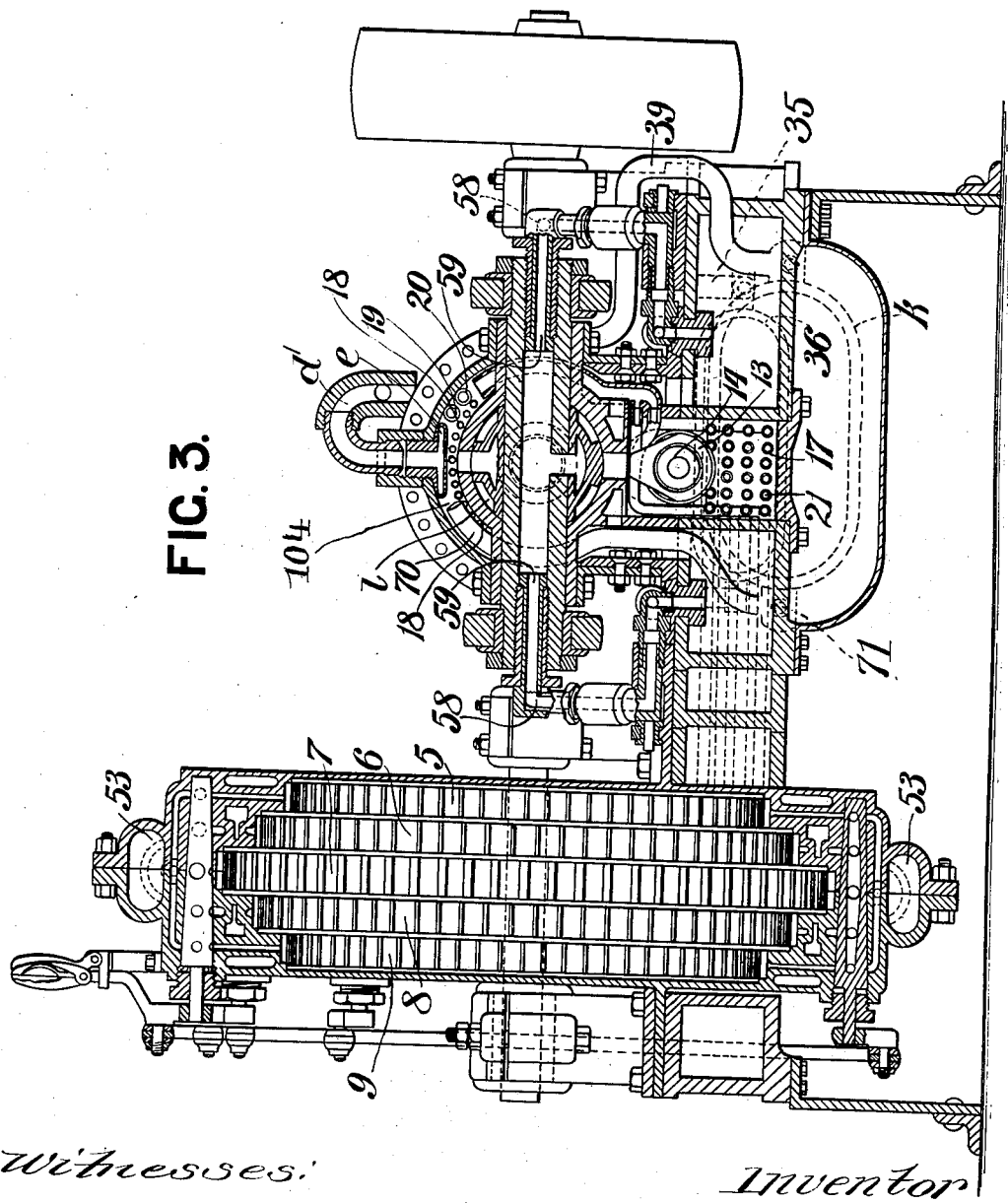

UNITED STATES PATENT OFFICE.

JOHN HUTCHINGS, OF LONDON, ENGLAND.

COMBINED TURBINE AND INTERNAL-COMBUSTION MOTOR-ENGINE.

935,512.       Specification of Letters Patent.     Patented Sept. 28, 1909.

Application filed February 24, 1908. Serial No. 417,574.

*To all whom it may concern:*

Be it known that I, JOHN HUTCHINGS, a subject of the King of Great Britain, residing at Capel House, 62 New Broad street, in the city of London, England, mechanical and mining engineer, have invented certain new and useful Improvements in and Relating to Combined Turbine and Internal-Combustion Motor-Engines, of which the following is a specification.

My present invention relates to improvements in a combined internal combustion engine and turbine, the turbine acting as an auxiliary motor while the internal combustion engine serves as a primary motor whereby the starting of the internal combustion engine may be facilitated and the power and efficiency thereof increased, the heat and other waste energy of the internal combustion engine being utilized to expand a motive fluid which serves to operate the turbine, engines of this general character being covered by my co-pending applications, Serial Numbers 353,485, filed January 22, 1907 and 353,642, filed January 23, 1907.

The primary object of the present invention is to simplify the construction of the combined turbine and internal combustion engine and at the same time to increase the economy and add certain advantageous features which are employed in the utilization of the heat developed in the engine.

In the accompanying drawing: Figure 1 is a longitudinal vertical section of a combined turbine and internal combustion engine embodying the present invention. Fig. 2 shows a sectional plan view of Fig. 1. Fig. 3 represents a transverse section of the apparatus.

In the figures, $a$ is the main shaft, and $b$ is the turbine shaft, $c$ is the pump mounted on the said main shaft, $d\ d$ are pipes leading from the pump $c$ to other pipes $d'$, $d'$ and therefrom to jackets of pipes $e$, $e$ located in jacket chambers 4, 4, surrounding the engine cylinder $f$ and pump cylinder $l$ as here indicated.

$q$ is the jacket covering; $o$, $o$ are the pipes which convey air from the receiver $k$ and deliver it by jets formed therein to the jacket between cylinder $f$ and the inclosing casing $q$ already referred to and 47 and 52 are respectively the cone valve and hydrocarbon supply regulating valve of substantially the same construction and for the same purpose as the correspondingly lettered valves of the specification of the said prior patent, No. 919174.

$g$ is the double ended piston, whose one end 1 is here shown as being utilized as the driving piston of the engine while 2 is the end employed for air compression.

3 are the water circulation chambers traversing the interior of the walls of the hollow pistons 1 and 2.

4 are the jacket spaces.

$h$ is a turbine herein shown as a triple expansion and reversible rotor, having five sets of blades set upon corresponding wheels, the first set of impact blades forming wheel 5 expanding into wheel 6, and the wheel 6 into wheel 7 in turn, while for the reverse action the set of blades 9 expand into the wheel blade spaces 8 and thence into the wheel 7, which wheel 7 it will thus be seen performs double duty, but the construction of this turbine forms no part of this particular application and invention, it being introduced solely as an indication of one mode of utilizing the present invention.

$i$ is the combustion chamber, from which 10 forms the exhaust outlet, controlled by valve 11.

Annular projections 12 are formed around the sleeve 13 and core 14 to form the zigzag chamber 15. These parts 12, 13, 14 and 15 are all mounted on an arm 16 depending from and reciprocating with the double piston 1—2 said arm projecting through a slot formed in the cylinder $f$. This arrangement enables the chamber 15 to take up the pressure of the exhaust and to utilize it in assisting the rearward movement of the piston 1 during the half-back or last portion of the stroke as stated hereinafter.

In my present invention I introduce firstly, water into a water pump $c$ on the main shaft $a$ which pump forces water through suitable pipes to the jackets of pipes surrounding said cylinder $f$ and pump $l$ and from openings in said pipes through which numerous jets play onto those cylinders, which pipes may or may not be fixed in alternate lines with pipes $o$; that is to say:—under such an improved arrangement the position of each water pipe $e$ would be radially midway between two pipes $o$ although at a different distance from the center line of the cylinder and each water pipe $e$ would be clear of the air pipes $o$ if desired, the jacket covering $q$ is enlarged to provide the extra space required for the accommodation of said water pipes. This arrangement would be applicable to either or both the air compressors, and the explosion cylinders of the said internal combustion engines described in said prior patent.

In my present invention the internal combustion engine is modified so as (while still employing a double-ended piston) to utilize one end 2 of said piston as an air compressor while the opposite end 1 is the piston of the internal combustion engine, and both piston-faces 1 and 2, are shown without valves, but with water circulating chambers 3 for abstracting heat, provided inside as shown and on the opposite side to their air compression or explosion chamber faces. The heat absorbed by the piston faces 1 and 2 is transmitted to the water in the said chambers 3 and is retransmitted to air in the spaces 4, 4 where it expands while on its way to a turbine $h$. The exhaust of the products of combustion in the chamber $i$ is effected through the orifice 10 cut through the cylinder walls $f$ for a distance equal to one half the stroke of the half piston 1, and near the exit point from the combustion chamber $i$ is inserted one or more suitably actuated valves one such valve being shown at 11, which valve is made in such a manner that while it is open widely for the exhaust and scavengering of hot gases during one half of the recessional movement of the engine pistons they are closed for the full forward stroke to enable full compression of the volume of air therein at the moment of change in direction of the stroke. The exhaust gases and scavengering air having left the combustion chamber $i$ in a direction slightly divergent from the lines of the axes of the engine cylinders $f$ it impinges against annular projections, shoulders, or vanes 12, 12 arranged in close series both on the sleeve 13 and around the core 14 so as to force the outflowing current of exhaust fluid to take a zig-zag path through chamber 15 formed between the core 14 and sleeve 13. This chamber 15 is attached to and placed below the engine piston, but owing to this position outside of the piston it has greater length and scope permitting of augmented surface whereon to receive the impelling forces of the exhaust gases and the like forces of the expanding scavengering air, and thus aid in the recession of the piston during the exhaust period of its stroke. After passing through this chamber 15 the hot gases are conveyed along or through a heating chamber 17 to a point near and partly surrounding the peripheral chamber of a turbine such as $h$ or like confining chamber for directing the expanding gases to the turbine. The specific construction of this turbine alone is not claimed in the present application, it forming the subject matter of a separate application, Serial No. 417,573, filed February 24, 1908. Its construction, however, has been generally described in order that its operation in combination with the internal combustion engine may be understood. The air coming from a receiver $k$ is conveyed through any suitable pipe connection (not shown) leading from said receiver and delivering into the jacket spaces 4, 4, which jacket spaces surround the cylinders $f$ and $l$ and thence this air passes through a series of orifices 18 into the pipes $o$ already referred to arranged around the explosion cylinder $f$. Herein the air passes from the jacketed spaces 4, 4, by the orifices 18 into pipes $o$ thence by a series of jets as shown into spaces 4, 4 (at the engine end) around the walls of the cylinder $f$ and onto those walls and thence by a pipe (the ends of which are shown disconnected at 19—19,) the air is conveyed from the said spaces 4, 4, at the engine end to and through the corresponding spaces 4, 4, at the compressor end but without the pipe 19 having any communication with the latter spaces 4, 4. This pipe 19 is continued so as to deliver air into other pipes 20 surrounding the compressor cylinder and thence into pipe 21 traversing the exhaust chamber and therein the current of air is divided from a single channel into a multiplicity of channels of small diameter to attain the greatest possible extent of heating surface and to thereby expand the current of air on its way through them so that the effective heat is utilized to its utmost so as to develop the greatest amount of force in the passing air against the peripheral vanes of the turbine.

The valves 22 of the air compressor $l$ are provided with stems 23 which are actuated by rods not shown made to extend to and be held by a suitable spring against a cam course as 24 formed or applied on the side of the geared wheel 26 and thus operating the valves 22 of the air compressors, or alternatively the valves 22 are operated by a modified arrangement of centered levers similar to those shown at 42—43 coacting with cams similar to those shown at 44—45 and its connections such as shown at 40—41. The high pressure pump $m$ in my present invention has its plunger 25 as herein shown attached to the outer face of the main compressor piston 2 and this plunger 25 extends through the end walls of the major compression chamber $l$, through packed glands, into a minor compression barrel and the control valves 27, 28, 29 of this barrel are so arranged as to take the feed directly from the adjoining main air compressor $l$ thus obviating the necessity for numbers of conducting pipes especially beneficial where the use of such would be inconvenient. The valve 27 closes a surrounding inlet passage leading from the chamber $l$ into an intermediate enlarged passage 31 through which the stem 32 upon which the valves 27 and 28 are fixed and the valve 29 is carried loosely. Intermediate of the valves 28 and 29 the passage 31 is constricted, and the enlarged portion around the valve 29 is again constricted into an inlet passage 33 to the plunger chamber $m$. The edges of the constrictions of the chamber 31 are formed as seatings for the inclined or coned faces of the respective valves 27, 28 and 29. Around the stem 32 is a coiled spring 34 the energy of which is constantly exerted to keep the valve 27 closed to its seat and to prevent return of air from chamber $m$ to chamber $l$. The pressure of the air compressed in chamber $l$ overcomes this spring and the movement of piston 2 forces air past valve 27, into chamber 31, closing for the moment valve 28, filling said chamber with air of the same density as that in chamber $l$, and as soon as the piston 2 retreats the valve 27 closes and valve 28 opens. The synchronous withdrawal of the high pressure plunger 25 in the chamber $m$ withdraws the valve 29 from its seat and air from chamber 31 into chamber $m$. The return stroke of plunger 25 forces valve 29 again to its seat and the charge of air in chamber $m$ into the communication pipe 35 leading to the high pressure receiver 36, against the pressure of a spring mounted in a chamber in rear of a valve 37 around whose stem said spring is coiled. This valve prevents the return of air into chamber $m$.

38 is a safety or overflow valve spring pressed to its seat and controlling an overflow passage from receiver 36 to the low pressure receiver $k$. The respective capacities of the receiving chambers 31 and $m$ being the same, the pressure of the air drawn from the one to the other, as described, and then forced into the pipe 35 is materially enhanced. The bulk of the air compressed in chamber $l$ is forced by way of the communicating pipe 39 into the storage chamber $k$ referred to; a pipe (not shown) connects the chamber $k$ with the right hand space 4 regarding Fig. 1 surrounding the lower pressure pump cylinder $l$. Suitable non-return valves of usual or convenient construction are interposed in said pipe 39.

As shown in Fig. 1, I have embodied the coined heating channel $x$ for the liquid hydrocarbon in a solid cap $n$, with a throttle or controlling valve $r$ for regulating the supply of hydrocarbon fluid to the explosion chamber $i$. This cap $n$ is screw-threaded and engages a corresponding thread formed in the explosion end of the cylinder $f$. This cap $n$ is internally screw-threaded and engaged with the external corresponding thread on the closing or end piece $p$ of the explosion cylinder, within the recess in which around about the valves 47 and 52 are inclosed the passages and parts for controlling supply of motive and scavengering fluids. This valve $r$ is actuated by a valve stem and lever arm $s$ which are accessible from the exterior of the cover or casing parts, for the imparting thereto of the necessary controlling or governing movement.

The valves 52 and 47 are actuated by their valve stem, here marked 40, which carries a head 41 on which is mounted an anti-friction roller device engaged by the roller 42 mounted on the head of an arm centered, at 43, and this roller 42 engages a cam 44 mounted on the shaft $a$ and conveys motion to the reciprocatory valve rod 40 derived from the revolution of said cam. Another cam 45 and similar intermediate buffer parts are used to give like motion to a like valve rod 46. This arrangement avoids the imparting of shocks and twisting and bending strains to the stems of the valves such as 47 and 52 besides enabling the parts to be arranged with great compactness and simplicity.

57, 57 are two portions of the semi-circular valve actuated by the rod 46, which rod is bifurcated and connected at the ends to the opposite ends of this valve 57. This valve 57 controls the passages through which air is allowed to flow into the cylinder $i$, in front of the piston $g$ in order to expel the products of combustion or "scavenger" the cylinder after the explosion.

The traverse of the air through the various parts of the engine may be described as follows: On starting the engine in the first instance, the air is drawn from the atmosphere into the refrigerating chamber 56 through the inlet 210. In this refrigerating chamber, the temperature begins to fall as soon as the engine is started, and the temperature of this atmospheric air is also subsequently reduced under the influence of the expanded exhaust air entering the chamber 56 from the turbine rotor chambers 5, 6, 7, 8 and 9. From the chamber 56, this cooled air is drawn into the pipe 211 which leads into the lower valve 22, the air thence entering the cylinder $l$ wherein it is compressed and then forced out through the upper valve 22 from which it is conducted by the pipe 39 into the receiver $k$. From the receiver $k$, this air passes through an outlet 71 and it is thence conducted by the pipe 70 into the compressor jacket 104 which surrounds the cylinder $l$, and after escaping through the orifices 72, this air enters the central chamber 4 and then passes through the orifices 18 to the pipes $o$ which are arranged around the explosion cylinder $f$. The air at this point is delivered from the pipes $o$ into the space 114 which surrounds the engine cylinder $f$ whereby this air is projected against the walls of said cylinder in the form of numerous small jets for the purpose of absorbing heat from the cylinder, and this air passes from the space 114 through the pipe 19. Those portions of the pipe 19 which extend through the spaces 114 and 4 are closed. From the pipe 19 the air passes into the pipes 20 which surround the compressor cylinder and thence into pipes 21 which are imperforate and pass through the exhaust chamber 17. The current of air in passing from pipes 20 to pipes 21 is divided into numerous streams of small diameter whereby the greatest possible area of heating surface may be obtained so that such streams of air are heated and consequently expanded on their way through such pipes so that the heat is utilized most effectively to develop the greatest amount of energy, preparatory to the projection thereof against the peripheral vanes of the turbine. From the pipes 21 in the exhaust chamber 17, the superheated air passes into the turbine feed channels 16 and is finally delivered in the proper direction according to the position of the valves against the vanes of the turbine for the purpose of propelling it. After passing through and being expanded in the peripheral turbine chambers 5, 6 and 7 or 9, 8 and 7, as the case may be, the air passes from the chamber 17 into the chamber 53 surrounding the turbine periphery and from this chamber the expanded air passes into the refrigerating chamber 56 where the moisture therein is precipitated against the metallic surfaces contained in this chamber, and after being cooled and deprived of the greater portion of its moisture, the air is again drawn into the compressor l and recompressed, thus completing its cycle.

Links, not shown, connect the roller arms 42 to arms 48 mounted on and operating the valves as 11 to convey operative motion between those parts to make the movements of the valves 11 coincident with the movements of the scavengering valve operating cam 45.

The pistons 1 and 2 besides the inter-wall channels 3 have central spaces 49, 49, into which water is introduced until they are approximately half filled so that as these pistons reciprocate the contained water therein and the like water supplied to chamber 3 is jerked to and fro splashing all sides of the chambers and absorbing the heat therein, and any steam developed is carried off by passages 50 leading into the central jackets 4, 4 wherein its heat is absorbed by the passing currents of air.
The supply of water is maintained from a water reservoir as 51 or other source of supply by way of any suitable conduits or tubes connecting reservoir 51 with the inlet passages at 58—58 Fig. 2 and indicated by dotted lines in Fig. 1. The water that has been led to the inlet passage 58 Fig. 2 thence passes to the channel 59 formed through the axial bar 60—carrying the pistons g—and thence the water passes by the passage 61 into the chambers 3 and by the lower channels 50 into the chambers 49, 49 until that chamber is partially filled, and wherein this water becomes converted into vapor and thence passes away through the upper passages 50 into the annular central chambers 4, 4 wherein admixture with inflowing air takes place and the heat of vapor becomes imparted to such air. The reservoir 51 also supplies water to chambers in the bed frame of the machine one end of which is seen at 62 whence water is drawn off through a non-return valve as 63 by the action of the pump plunger c already mentioned and forced through another valve 64 and pipe d to the various pipes e to be distributed in jets as already explained.

The circuitous channel 53 formed circumferentially around the turbine h communicates with the air exhaust passages as 54—55 which lead from the turbine or rotor chamber to this channel 53 and thence the exhausted air passes to a refrigerating chamber 56 and away to be recompressed for reuse.

In some cases I convey air from the chambers 4 into the circular passage 55ᴬ (Fig. 2) and therefrom by a suitable pipe (not shown) into the pipes 21, so as to directly convey the air to this source of heat without exposure.

Having now particularly described and ascertained the nature of my said invention, and in what manner the same is to be performed, I declare that what I claim is:—

1. A combined internal combustion engine and turbine comprising an internal combustion engine cylinder having jacketing pipes, a compressor having a cylinder also provided with jacketing pipes, a pump actuated by the shaft of the combustion engine and having means connected thereto for conveying water to the jacketing pipes of the internal combustion engine and compressor cylinders, air conducting pipes forming a jacket for the internal combustion engine cylinder, a double-ended piston having one end arranged to reciprocate within a part of the engine cylinder wherein the combustion or explosion takes place and the other end arranged to reciprocate in the air compression cylinder chamber, valves for controlling the inlet and outlet of the air prior and subsequent to compression, and means for storing the air thus compressed.

2. An engine of the character described comprising a compressor cylinder, a piston mounted to reciprocate therein, a relatively smaller plunger mounted on one end of the compressor piston and extending through an end wall of its cylinder, a second cylinder surrounding said plunger, a compression chamber connecting the two cylinders, and a set of valves mounted in the compression chamber and serving to close communication between it and the plunger cylinder while said chamber is receiving a charge of air from the compressor cylinder and for closing communication between the chamber and the compressor cylinder when such charge of air from the compression chamber is being discharged into the plunger cylinder.

3. An internal combustion engine comprising a cylinder having an exhaust port formed in a wall thereof, a piston mounted to reciprocate in said cylinder and to uncover the exhaust port at a predetermined point in its power stroke, and means for assisting said piston in its power stroke comprising a sleeve movable therewith and adapted to receive the exhaust gases discharged from the port in the wall of said cylinder, said sleeve being provided with parts against which the exhaust gases impinge.

4. An internal combustion engine comprising a cylinder provided with an exhaust port formed in one of its walls, a piston mounted to operate in said cylinder and arranged to uncover the exhaust port at a predetermined point in its power stroke, a tubular member connected to and offset relatively to the axis of said piston and arranged to receive the exhaust gases from said port, and a series of axially spaced annular blades arranged within the bore of said tubular member and providing an enlarged area against which the exhaust gases impinge.

5. An internal combustion engine comprising a cylinder provided with an exhaust port in one of its walls, a piston mounted to operate within the cylinder and adapted to uncover said exhaust port during its power stroke, an arm projecting laterally on said piston, a tubular member carried by said arm and arranged to receive the exhaust gases from said port when the latter is uncovered, said tubular member being provided with means for impingement of the exhaust gases, and a valve for closing said exhaust port at the completion of the power stroke of said piston.

6. An internal combustion engine comprising a cylinder provided with an exhaust port in one of its walls, a piston mounted to reciprocate therein and arranged to uncover said port at a point intermediate the length of its power stroke, a tubular trumpet-shaped member connected to move with said piston and arranged to receive the gas exhausted through said port, a core extending axially within the tubular member, sets of annular ribs formed within the bore of said member and surrounding said core, said ribs being arranged in staggered relation for the impingement of the exhaust gases, and a valve for closing the exhaust port after the said piston has completed its power stroke.

7. An engine of the class described comprising a pair of cylinders arranged in opposed relation, a piston element having piston heads at its opposite ends arranged to operate in the respective cylinders and having an internal water chamber, surrounding air conducting passages, and communicating passages between the air passages and said chamber, means for conducting air through the air passages, and means for conducting water to the said water chamber during the reciprocatory movements of the piston.

8. A combined internal combustion engine and turbine acting respectively as primary and secondary motors, the internal combustion engine comprising a cylinder, a piston mounted to operate therein and having an air conducting passage formed interiorly thereof for absorbing the heat of the piston head, said piston being also provided with an internal water chamber having communication with the air passage, means for conducting air to the air passage in said piston, means for conducting water to the water passage therein, and means for conducting the heated air and water to the turbine.

9. An engine of the class described comprising a pair of cylinders arranged in opposed relation, a reciprocatory piston element comprising piston heads arranged to reciprocate in the respective cylinders, one of said cylinders acting as an internal combustion engine, and the other cylinder as an air compressor, the piston element being provided with an internal water chamber and also with an air conducting passage communicating with said water chamber, means for conducting air to the piston element, means for conducting water to the water chamber therein, a turbine, and means for conducting the heated air and water from the piston element to said turbine as a motive fluid.

10. An engine of the class described comprising a jacketed internal combustion engine cylinder, a piston mounted to operate therein, a jacket of perforated water pipes arranged within the jacket of said cylinder, a jacket of perforated air supply pipes also arranged in the cylinder jacket in stationary relation thereto, means for supplying compressed air to the jacket of air supply pipes for delivering jets of air therefrom against the heated walls of said cylinder, and means for supplying water to the jacket of water pipes for projecting jets of water therefrom against the cylinder wall.

11. An engine of the class described comprising an internal combustion engine cylinder provided with a surrounding jacket, a piston mounted to operate in said cylinder and provided with internal fluid-circulating passages adapted to receive air and water, means for conducting air to said piston, means for conducting water thereto during its operation, the passages within the piston communicating with the jacket surrounding its cylinder, a turbine, means for conducting the heated and expanded fluid from the cylinder jacket to said turbine.

12. An engine of the class described comprising an internal combustion engine cylinder provided with an exhaust port, a piston mounted to operate therein, the cylinder being provided with a jacket and piston with a fluid conducting passage, a heating chamber into which the exhaust gases from said cylinder are discharged, a turbine, means for conducting fluid to the passages of said piston and the jacket of said cylinder wherein it absorbs heat from said parts, a set of superheating pipes arranged within said heating chamber and having a multiple connection with the heat-absorbing jacket of said cylinder, and means for establishing communication between the superheating pipes and the inlets of the turbine.

13. An engine of the character described comprising an internal combustion engine cylinder and an air compressing cylinder mounted in opposed relation, a piston element having heads upon its ends arranged to operate in the respective cylinders, a heating chamber connected to receive the gases exhausted from the internal combustion engine, a tank into which air from said compressor is stored, jackets surrounding the said cylinders, a jacket of perforated water supply pipes arranged in the surrounding jacket of each cylinder, a pump for supplying water to said pipes, a jacket of perforated air supply pipes arranged within the jacket of the internal combustion engine cylinder, means for conducting air from said storage tank to the air supply pipes surrounding the internal combustion engine cylinder, means for conducting heated air from the jacket of the interal combustion engine cylinder to the jacket of the compressor cylinder, a set of superheating pipes arranged within the heating chamber and having a multiple connection with the jacket of the compressor, and an auxiliary motor connected to receive a superheated motive fluid from the superheating pipes.

14. An internal combustion engine comprising a cylinder, a piston mounted to operate therein, a head mounted in the cylinder, a cap arranged at the inner side of the cylinder head and provided with a convoluted channel through which the motive fluid is supplied, a valve for governing the flow of the motive fluid from said channel, and means accessible from the exterior of the cylinder head for manipulating the said valve.

In testimony whereof I have hereunto set my hand in presence of two subscribing witnesses.

JOHN HUTCHINGS.

Witnesses:
ALFRED GEORGE BROOKES,
HARRY JOHN STOYDEN.